United States Patent [19]

Sasaki et al.

[11] Patent Number: 4,841,382
[45] Date of Patent: Jun. 20, 1989

[54] AUDIO RECORDING DEVICE

[75] Inventors: Akihiko Sasaki; Hiroaki Atsumi, both of Tokyo, Japan

[73] Assignee: Fuji Photo Film Co., Ltd., Kanagawa, Japan

[21] Appl. No.: 110,340

[22] Filed: Oct. 20, 1987

[30] Foreign Application Priority Data

Oct. 20, 1986 [JP] Japan ............................. 61-247608
Oct. 20, 1986 [JP] Japan ............................. 62-247610

[51] Int. Cl.⁴ ............................................. G11B 5/00
[52] U.S. Cl. .................................................. 360/32
[58] Field of Search ............................. 360/8, 32, 51

[56] References Cited

U.S. PATENT DOCUMENTS 4,410,917 10/1983 Newdoll et al. ...................... 360/15
4,722,009 1/1988 Nakama et al. ......................... 360/8

Primary Examiner—Vincent P. Canney
Attorney, Agent, or Firm—Birch, Stewart, Kolasch & Birch

[57] ABSTRACT

A sound signal recorded in a memory synchronously with a low-frequency clock signal is read out with the low-frequency clock signal to reproduce a normal sound, thereby enabling checking of the sound signal recorded in the memory. For recording in a recording medium, the sound signal is read out with a high-frequency clock signal to effect time axis compression. By designating an address to start writing, a sound signal can be written starting with any address thereby facilitating editing. An analog sound signal previously recorded on a magnetic recording medium is time axis expanded by a time axis expansion device and then outputted from a sound output device, and the analog sound signal is hybridized with another analog sound signal inputted from a microphone, time axis compressed by a time axis conversion device, and recorded on the magnetic recording device.

4 Claims, 4 Drawing Sheets

AUDIO RECORDING DEVICE

BACKGROUND OF THE INVENTION

1. Field of the Invention

This invention relates to an audio recording device which provides easy editing of voice and sound to be recorded on a floppy disk on which video signals are recorded.

2. Description of the Prior Art

There is generally known a device which records a still picture video signal on a magnetic floppy disk, such as an electronic still camera, and a device which uses a floppy disk of approximately 47 mm in diameter and approximately 40 μm in thickness has been standardized and practically used. The floppy disk is rotated at a speed of 3,600 rpm to record 50 frames of still pictures on 50 tracks in a frame recording mode, or 25 frames of still pictures on 50 tracks in a field recording mode. The track width is 60 μm and the track pitch is 100 μm, and a guard band of 40 μm in width is provided between tracks. Reproduced pictures can be displayed on a television screen, or printed out by a printer to obtain hard copies.

A time axis compression is used when recording an audio signal on such a floppy disk, and a time axis expansion is used when reproducing the audio signal from the floppy disk. Since the floppy disk makes one revolution in 1/60 second, only 1/60 second an audio can be recorded per track without time axis compression. By compressing the time axis to 1/640, for example, a sound signal of about 10 seconds can be recorded on a track. The sound signal includes a variety of signal components within the sound frequency bank such as a narrative description of the still picture recorded, background music for the reproduced picture, and the background sound present when photographing a scene with the electronic still camera.

FIG. 2 is a block diagram of a typical audio signal recording device, and FIG. 3 is a block diagram of an audio signal reproduction device.

Referring to FIG. 2, a sound signal 3 supplied from a microphone 1 to an input terminal 2 is passed through a low-pass filter (LPF) 4 and a noise reduction circuit (NR) 5, and then inputted to a time axis compression device 6. The time axis compression device 6 comprises an A/D converter 7, a RAM (random access memory) 8, a D/A converter 9, an address counter 10, a write clock generator 11, and a read clock generator 12. The address counter 10 is connected to a recording start switch 13 and a PG detecting device 14. For a time compression factor of M, the frequency of a read clock signal 12a is set to M-times a frequency fs of a write clock signal 11a, that is, M.fs. A sound signal 5a from the noise reduction circuit 5 is converted to a digital sound signal 7a by the A/D converter 7 with a sampling frequency of fs. The digital sound signal 7a is stored in the RAM 8 after the recording start switch 13 is turned on and with the address advanced by the address counter 10 having a write clock frequency of fs. Numeral 10a indicates an address signal. After the digital sound signal 7a is recorded in a predetermined location of the RAM 8, the address counter 10 advances the address with a read clock frequency of M.fs to read the contents of the RAM 8. A digital sound signal 8a read from the RAM 8 is converted to an analog sound signal 9a by the D/A converter 9 with a clock frequency of M.fs. The thus obtained analog sound signal 9a represents the sound signal 3 applied to the input terminal 2 with a time axis compressed to 1/M.

The time-compressed analog signal 9a has its high frequency range emphasized by a pre-emphasis circuit 15, modulated by a frequency modulator 16, and is then recorded on an appropriate track of a floppy disk 19 through a recording amplifier 17 and a magnetic head 18. Numeral 20 indicates a motor for rotating the floppy disk 19.

The time compression factor is determined by a frequency band which can be recorded on the floppy disk 19 and an upper limit frequency required for recording the sound signal. Electronic still cameras or the like can record by FM modulating a 6 MHz carrier with a sound signal of 3.2 MHz after compression on a floppy disk which rotates at a speed of 3,600 rpm. Where the upper limit frequency is fv (KHz), the compression ratio is given as M=3,200/fv. A sound signal which can be recorded is given as T=M/60=3,200/60fv. Table 1 shows the values for fv=2.5KHz, 5KHz, and 10KHz.

TABLE 1

| Mode | Upper limit frequency fv (KHz) | Recording time T (sec) | Compression ratio M (times) | Write clock fs (KHz) example | Read clock M.fs (MHz) example |
|---|---|---|---|---|---|
| 10 sec | 5 | abt. 10 | 640 | 10 | 6.4 |
| 5 sec | 10 | abt. 5 | 320 | 20 | 6.4 |
| 20 sec | 2.5 | abt. 20 | 1,280 | 5 | 6.4 |

In the reproduction circuit, referring to FIG. 3, when the reproduction switch 32 is turned on, a signal 21a is inputted from a magnetic head 21 to an amplifier 22 where it is amplified, demodulated by a demodulator 23, inputted to a de-emphasis circuit 24 to de-emphasize its high frequency range, and inputted to a time axis expansion circuit 25. The time axis expansion circuit 25 comprises an A/D converter 26, a RAM 27, a D/A converter 28, an address counter 29, a write clock generator 30, and a read clock generator 31. The address counter 29 is connected to reproduction switch 32 and a PG detecting device 33. The frequency of a write clock signal 30a is the same as that of the read clock signal 12a in the time axis compression device 6 of the recording device shown in FIG. 2, that is, M.fs. The frequency of a read clock signal 31a is the same as that of the write clock signal 11a in the time axis compression device 6, that is, fs. A time-compressed analog signal 24a obtained in the de-emphasis circuit 24 is converted to a digital sound signal 26a by the A/D converter 26 with a sampling frequency of M.fs. The digital sound signal 26a is stored in the RAM 27 with the address advanced by the address counter 29 having a clock frequency of M.fs synchronizing with a PG signal 33a from the PG detecting device 33. Numeral 29a indicates an address signal. When the digital sound signal 26a is completely stored in the predetermined location of the RAM 7, the address counter 29 advances the address with a clock frequency of fs to read the contents of the RAM 27. A digital sound signal 27a read from the RAM 7 is converted to an analog sound signal 28a by the D/A converter 28 with a clock frequency of fs. The thus obtained analog signal 28a is a sound frequency band signal with the original time axis. The sound signal 28a is applied through a low-pass filter 34, a noise-reduction circuit 35, and an amplifier 36, to a speaker 37, and outputted as a sound.

In the above-described prior art technology, after a sound signal has been once recorded on the floppy disk 19, it has been difficult to change the recorded contents. To change the recorded contents, the sound signal recorded on the floppy disk 19 must be erased, and then a new sound signal must be recorded. The new sound signal must be reproduced from the floppy disk 19 to check if it is correctly recorded. Further, to record a combination of sound signals, for example, to record music for the first 5 seconds and a human voice narration for the next 5 seconds, the music must be played on the microphone 1 for 5 seconds, and the narrator must begin to speak immediately after the music. Thus, it is difficult to match the timing to switch from the music to the narration, and a mismatched timing or a blank period of no sound may result. If this is the case, the recording operation must be performed again, requiring a troublesome operation.

Further, in the prior art technology, to record background music and a narration in an overlapped fashion, the background music and narration must be recorded simultaneously, which has required a troublesome operation. For such a case, it would be convenient if there is a so-called "sound-on-sound" function which enables narration recording while hearing the background music and matching the timing.

SUMMARY OF THE INVENTION

With a view to obviate all of the prior art defects of audio recording devices, it is a primary object of the present invention to provide an audio recording device which can edit a sound signal to add or change it in a RAM and check the edited sound signal.

In accordance with the present invention which attains the above object, there is provided a first audio recording device comprising an A/D converter for converting an inputted analog sound signal to a digital sound signal, a memory to be written with the digital sound signal, a D/A converter for converting the digital sound signal read out of the memory to the analog sound signal, an addresses counter for designating address of the memory to write or read, a magnetic recording device for recording the analog sound signal on a rotary magnetic recording medium, a sound output device for receiving the analog sound signal to output a sound, a sound signal select switch for switching the analog sound signal selectively to the magnetic recording device or the sound output device, a system controller which writes the digital sound signal onto the memory synchronizing with a low-frequency first clock signal, and records the analog sound signal by reading the digital sound signal from the memory synchronizing with a high-frequency second clock signal and transmitting a D/A converted analog sound signal to the magnetic recording device through the sound signal select switch, and when outputting a sound from the sound output device, reads the digital sound signal from the memory synchronizing with the first clock signal and transmits a D/A converted analog sound signal to the sound output device through the sound signal select switch, an input device for setting a memory address to start writing and conditions for selecting the sound signal to be outputted as a sound or to be recorded by the magnetic recording device, and an address indicator for indicating an address designated by the address counter.

It is preferable to use a floppy disk as the magnetic recording medium.

There is also provided a second audio recording device according to the present invention comprising a magnetic recording/reproduction device for reproducing an FM modulated sound signal from a rotary magnetic recording medium, a time axis expansion device for A/D converting the reproduced and FM demodulated sound signal to a digital sound signal, writing the digital sound signal onto a memory synchronizing with a first clock signal, reading the digital sound signal from the memory synchronizing with a second clock signal having a lower frequency than the first clock signal, and D/A converting the read digital sound signal to an analog sound signal, a mixer for mixing the D/A converted analog sound signal and an analog sound signal inputted from a microphone to obtain a hybrid analog sound signal, a time axis conversion device for A/D converting the hybrid analog sound signal to a hybrid digital sound signal, writing the hybrid digital sound signal onto a memory synchronizing with a clock signal having the same frequency as the second clock signal, reading the hybrid digital sound signal synchronizing with a clock signal having the same frequency as the first clock signal switched by a W/R controller when recording on the magnetic recording medium, or reading the hybrid digital sound signal synchronizing with a clock signal having the same frequency as the second clock signal switch by the W/R controller when outputting to a sound output device, and D/A converting the read hybrid digital sound signal to a hybrid analog signal, a select switch for switching the hybrid analog sound signal to a sound output device or a magnetic recording/reproduction device, a sound output device for converting the D/A converted analog sound signal or the hybrid analog sound signal into a sound and outputting the sound, and a magnetic recording/reproduction device for FM demodulating the D/A converted hybrid analog sound signal and recording the demodulated hybrid analog sound signal on the rotary magnetic recording medium.

It is preferable to use a floppy disk as the magnetic recording medium.

DETAILED DESCRIPTION OF PREFERRED EMBODIMENTS

Figure 1:
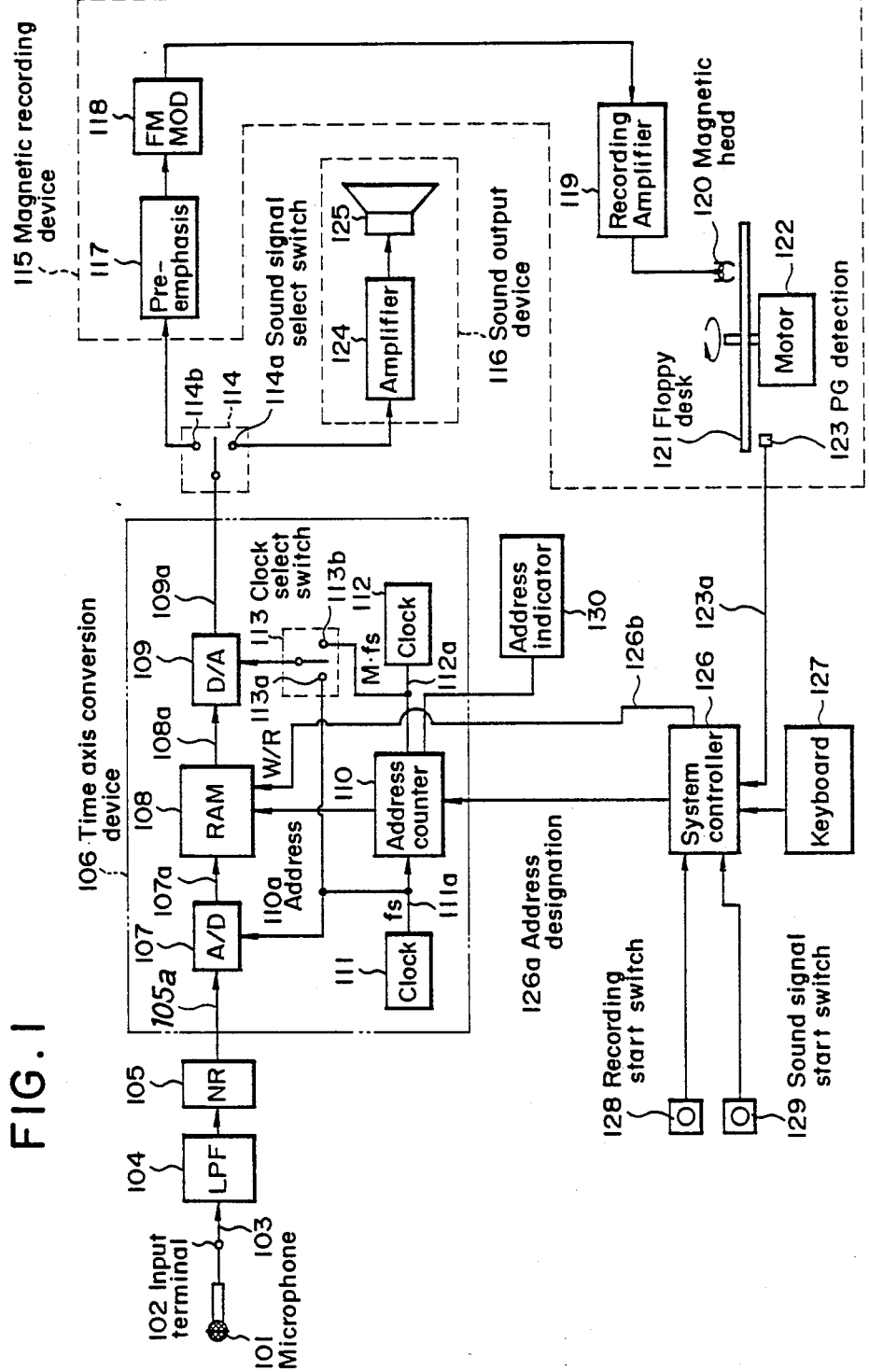
FIG. 1 is a block diagram showing a first embodiment of the audio recording device according to the present invention.
Figure 2:
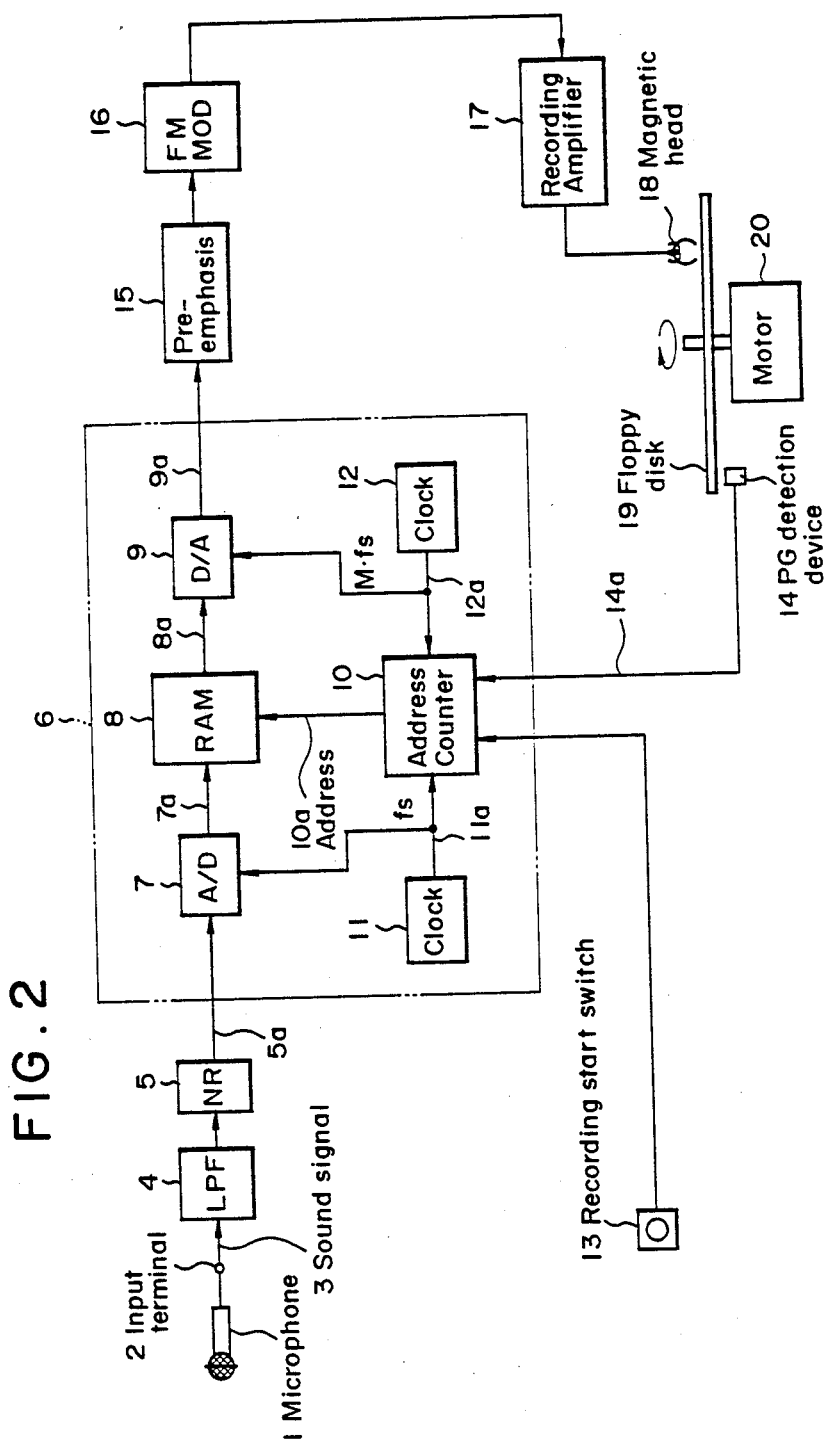
FIG. 2 is a block diagram showing a prior art audio recording device.
Figure 3:
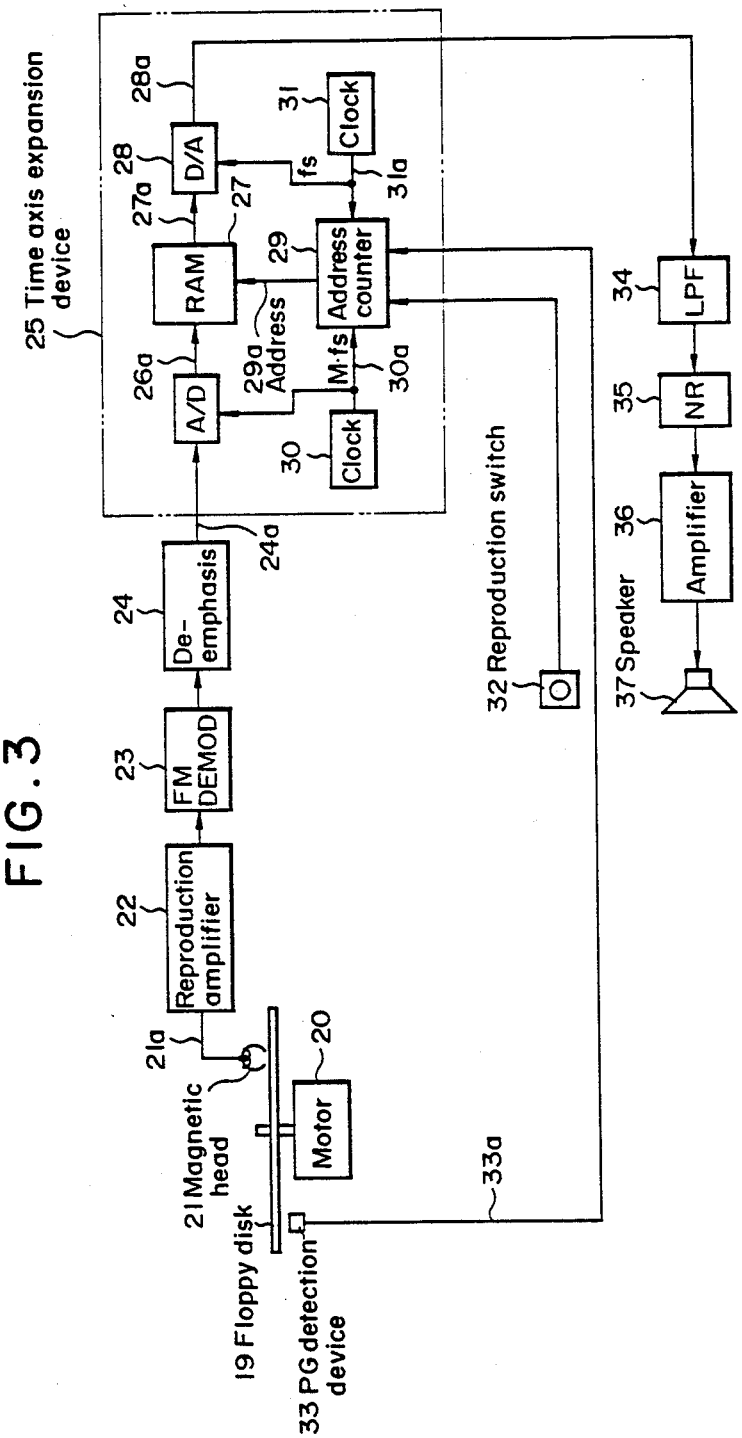
FIG. 3 is a block diagram showing a prior art audio reproduction device.

A preferred embodiment of the present invention will now be described in detail with reference to the drawings. FIG. 1 is a block diagram showing one embodiment of the present invention. Referring to FIG. 1, a sound signal 103 applied from a microphone 101 to an input terminal 102 is passed through a low-pass filter (LPF) 104 and a noise reduction circuit (NR) 105 and inputted to a time axis conversion device 106. The time axis conversion device 106 comprises an A/D converter 107, a RAM (random access memory) 108, a D/A converter 109, an address counter 110, a clock generator 111, a clock generator 112, and a clock select switch 113. For a time compression factor of M, the frequency of a clock signal 112a of the clock generator 112 is set to M-times a frequency fs of a clock signal 111a of the clock generator 111, that is M.fs.

A sound signal 105a from the noise reduction circuit 105 is converted to a digital sound signal 107a by the A/D converter 107 with a sampling frequency of fs. The digital sound signal 107a is written onto the RAM 108. The D/A converter 109 is inputted with the clock signal 111a or the clock signal 112a through the clock select switch 113. A digital sound signal 108a read out of the RAM 108 is converted to an analog sound signal by the D/A converter 109.

A sound signal select switch 114 switches the analog sound signal selectively to a magnetic recording device 115 or a sound output device 116. The magnetic recording device 115 comprises a pre-emphasis circuit 117, a frequency modulator 118, a recording amplifier 119, a magnetic head 120, a floppy disk 121, a motor 122, and a PG detection device 123. The sound output device 116 comprises an amplifier 124 and a speaker 125.

A system controller 126 is connected with the PG detection device 123, a keyboard 127, a recording start switch 128, and a sound signal start switch 129. The system controller 126 outputs an address designation signal 126a to the address counter 110, and a read/write signal 126b to the RAM 108.

An address indicator 130 indicates address designated by the address counter 110.

Operation of the audio recording device having such an arrangement will now be described. The recording time mode is set to a 10-second mode, in which the compression factor M is 640, fs is 10 KHz, Mfs is 6.4 MHz.

(i) Write operation to the RAM 108

The system controller 126 transmits an address designation signal 126a to reset the address designated by the address counter 110 and a read/write signal 126b to set the RAM 102 to a write enable status. With this status, a sound is inputted into the microphone 101 and the recording start switch 128 is turned on. Extraneous components in the sound signal 103 from the microphone 101 are removed to obtain a sound signal 105a. The sound signal 105a is converted to a digital sound signal 107a by the A/D converter 107 with a sampling frequency of fs. The digital sound signal 107a is written onto the RAM 108 after the recording start switch 128 is turned on and with the address advanced by the address counter 110 with a clock frequency of fs. The write operation is completed in about 10 seconds.

(ii) Sound output operation

To output the sound after writing the RAM by the above-described operation (i), a sound output instruction is inputted to the system controller 126 using the keyboard 127. The system controller 126 turns the clock select switch 113 to a terminal 113a and the sound signal select switch 114 to a terminal 114a, and transmits the read/write signal 126b to set the RAM 108 to a read enable status. With this status, when the sound signal start switch 129 is turned on, the address counter 110 advances the address with a clock frequency of fs to read the contents of the RAM 108. The thus read digital sound signal 108a is converted to an analog sound signal 109a by the D/A converter 109 with a clock frequency of fs. In this case, the time axis of the analog sound signal 109a is the same as that of the sound signal 103, that is about 10 second. The analog sound signal 109a is passed through the sound signal select switch 114, amplified by the amplifier 124, and applied to the speaker 125. As a result, a sound is outputted from the speaker 125. The sound can be used to check the contents of the RAM 108.

(iii) Magnetic recording operation

After the writing is completed by the above-described operation (i) and the contents are checked by the operation (ii), magnetic recording is performed. To perform magnetic recording, a magnetic recording instruction is inputted to the system controller 126 using the keyboard 127. The system controller 126 turns the clock select switch 113 to a terminal 113b and the sound signal select switch 114 to a terminal 114b, and transmits the read/write signal 126b to set the RAM 108 to a read enable status. With this status, when the sound signal start switch 129 is turned on, the address counter 110 advances the address with a clock frequency of M.fs to read the contents of the RAM 108. The thus read digital sound signal 108a is converted to the analog sound signal 109a by the D/A converter 109 with a clock frequency of M.fs. In this case, the time axis of the analog sound signal 109a is compressed to 1/M that of the sound signal 103.

The time-compressed analog sound signal 109a has its high-frequency range emphasized by the pre-emphasis circuit 117, modulated by the frequency modulator 118, and recorded on an appropriate track or guard band of the floppy disk 121 through the recording amplifier 119 and the magnetic head 120.

(iv) Edit operation

As a result of checking the contents by the above-described operation (ii), there may be a case in which part of the contents is to be changed. In such a case, when checking the contents during the sound output operation, the beginning address of the part to be changed is noted from the reading of the address indicator 130. The noted address and an edit instruction are inputted to the system controller 126 using the keyboard 127. The system controller 127 sets the count value of the address counter 110 to the designated address, and transmits the read/write signal 126b to set the RAM to a write enable status. With this status, a new sound is inputted to the microphone 101 and the recording start switch 128 is turned on. Extraneous components in the sound signal 103 from the microphone 101 are removed to obtain the sound signal 105a, which is converted to the digital sound signal 107a by the A/D converter 107 with a sampling frequency of fs. The digital sound signal 107a is written into the RAM 108 after the recording start switch 128 is turned on and with the address advanced by the address counter 110 with a clock frequency of fs. Thus, the new sound signal is written into the RAM 108 starting with the designated address. It is needless to say that the previous sound signal before the designated address remains unchanged.

An address from which the edit is to be started and an address at which the edit operation is to be stopped can be inputted to the system controller 126 to rewrite part of the sound signal between both addresses as a new sound signal.

Using the edit operation, the address can be moved to a location to start editing and a sound signal can be re-inputted starting with that address, or part of the sound signal between particular addresses can be replaced, or voices of a number of persons can be inputted while editing by stopping the address at each time.

Figure 4:
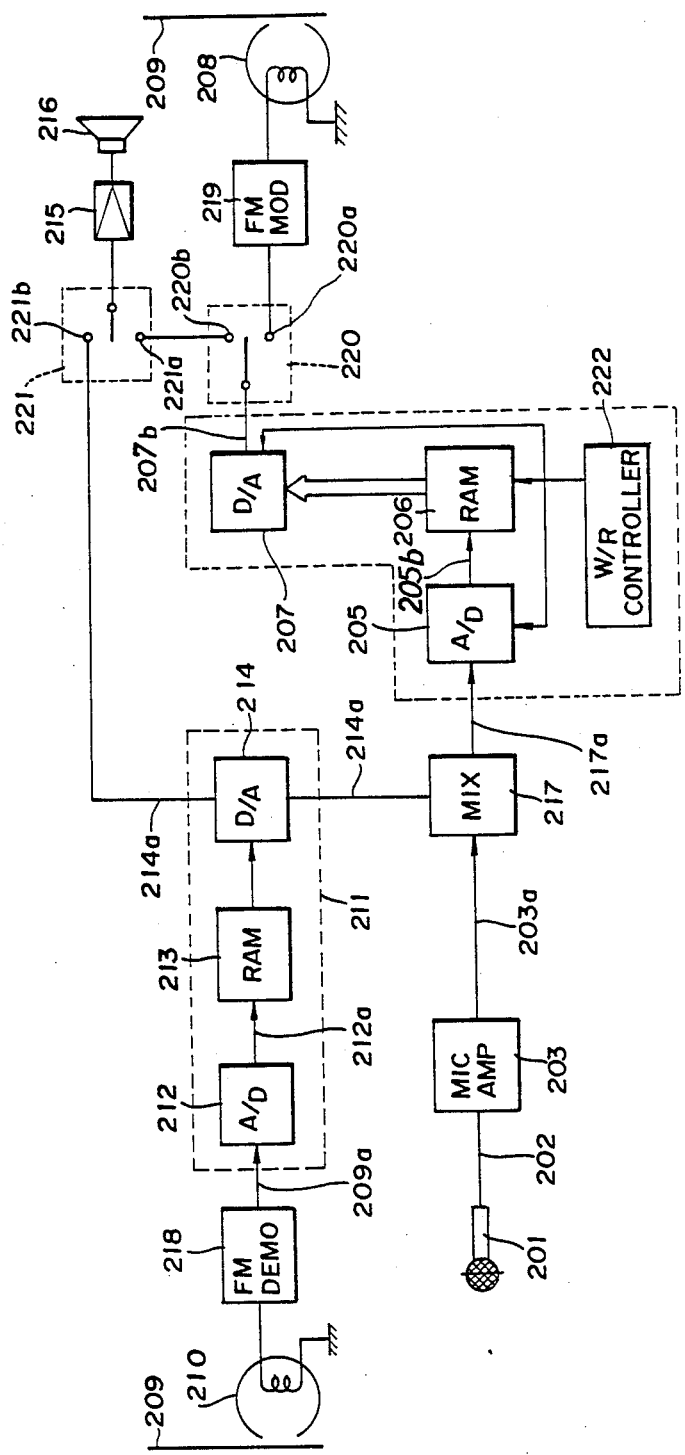
FIG. 4 is a block diagram showing a second embodiment of the audio recording device according to the present invention.

Another embodiment of the present invention will now be described in detail with reference to FIG. 4. Referring to FIG. 4, an FM modulated signal reproduced from a floppy disk 209 to a reproduction head 210 is demodulated by a demodulator 218 into a sound signal 209a, which is inputted to a time axis expansion device 211. The time axis expansion device 211 comprises an A/D converter 212, a RAM 213, and a D/A converter 214, and expands the time axis M-times. The sound signal 209a is converted to a digital signal 212a by the A/D converter 212 with a sampling frequency of M.fs. The digital signal 212a is written into the RAM 213 synchronizing with a clock signal of M.fs. The written digital signal 212a is read synchronizing with a clock signal of fs and converted to an analog signal 214a by the D/A converter 214 with a clock frequency of fs. The analog signal 214a is an M-times expanded signal of the sound signal 209a inputted from the reproduction head 210. With a select switch 221 turned to a terminal 221b, the analog signal 214a is amplified by an amplifier 215 and converted by a speaker 216 into a sound which is outputted. While checking the sound, a different sound is inputted to a microphone 201. When the already recorded sound signal is a background signal, the other signal can be a descriptive narration for the picture. The different sound is converted by the microphone 201 into a sound signal 202, which is amplified by an amplifier 203 and inputted to a mixer 217. In the mixer 217, a sound signal 203a from the amplifier 203 and the sound signal 214a from the D/A converter 214 are combined, or hybridized, to obtain a hybrid analog sound signal 217a, which is inputted to a time axis conversion device 204. The time axis conversion device 204 comprises an A/D covnerter 205, a RAM (random access memory) 206, and a D/A converter 207, and compresses the time axis by a factor of 1/M. Thus, the hybrid analog sound signal 217a from the mixer 217 is converted to a hybrid digital signal 205b by the A/D converter 205 with a sampling frequency of fs. The hybrid digital signal 205b is written into the RAM 206 synchronizing with a clock signal of fs. The written hybrid digital signal 205b is read with a read clock frequency switched to fs by a W/R controller 222 in order to previously check the edit result, and converted to a hybrid analog signal 207b by the D/A converter 207 with a clock frequency of fs. With a select switch turned to a terminal 220b and a select switch 221 turned to a terminal 221a, the hybrid analog signal 207b is amplified by the amplifier 215 and converted by the speaker 216 into a sound which is outputted. When the edit result is correct, the select switch is turned to the terminal 221a, the hybrid digital signal is read from the RAM 206 with a read clock frequency switched to M.fs by the W/R controller 222, and converted to a hybrid analog signal 207b by the D/A converter 207 with a clock frequency of M.fs. The thus obtained hybrid analog signal 207b is such that the sound signal 203a inputted to the microphone 201 and the previously recorded sound signal 214a are combined and the time axis is compressed to 1/M, which is recorded on the floppy disk 209 through a recording head 208.

In the above-described embodiment, the sound signal 203a inputted from the microphone 201 is immediately hybridized by the mixer 217. Alternatively, however, the sound signal 203a can be once recorded in a recording device of any type, and then can be combined with the sound signal 214a with synchronization by a switching operation. The select switches 220 and 221 can also be linked interlockingly for easy switching operation.

With this embodiment of the present invention, a different sound signal can be recorded superimposed with a previously recorded sound signal while reproducing and hearing the previously recorded sound signal, thus providing a great convenience.

We claim:
1. An audio recording device comprising:
   A/D converter means for converting an inputted analog sound signal to a digital sound signal;
   memory means for storing said digital sound signal;
   D/A converter means for converting said digital sound signal read out of said memory means to an analog sound signal;
   an address counter for designating an address of said memory means to write or read signals therefrom;
   a magnetic recording device for recording said analog sound signal on a rotary magnetic recording medium;
   a sound output device for receiving said analog sound signal to output a sound;
   a sound signal select switch for switching said analog sound signal to said magnetic recording device or said sound output device;
   a system controller for writing said digital sound signal into said memory means sychronously with a low-frequency first clock signal for recording said analog sound signal on said recording medium by said magnetic recording device, by reading said digital sound signal from said memory means synchronously with a high-frequency second clock signal and transmitting a D/A converted analog sound signal select switch, and for outputting a sound from said sound output device by reading said digital sound signal from said memory means synchronously with said first clock signal and transmitting a D/A converted analog sound signal to said sound output device through said sound signal select switch;
   an input device for setting a memory address to start writing and setting conditions for selecting said sound signal to be outputted as a sound or to be recorded by said magnetic recording device; and
   an address indicator for indicating an address designated by said address counter.

2. An audio recording device as claimed in claim 1, wherein said magnetic recording medium is a floppy disk.

3. An audio recording device comprising:
   a magnetic recording/reproduction device for reproducing an FM modulated sound signal from a rotary magnetic recording medium;
   a time axis expansion device for A/D converting a reproduced and FM demodulated sound signal to a digital sound signal, writing said digital sound signal into a memory synchronously with a first clock signal, reading said digital sound signal from said memory synchronously with a second clock signal having a lower frequency than said first clock signal, and D/A converting said read digital sound signal to an analog sound signal;

a mixer for mixing said D/A converted analog sound signal and an analog sound signal inputted from a microphone to obtain a hybrid analog sound signal;

a time axis conversion device for A/D converting said hybrid analog sound signal to a hybrid digital sound signal, writing said hybrid digital sound signal into a memory synchronously with a clock signal having the same frequency as said second clock signal, reading said hybrid digital sound signal synchronously with a clock signal having the same frequency as said first clock signal switched by a write/read controller when recording a hybrid analog signal on said magnetic recording medium, and reading said hybrid digital sound signal synchronously with a clock signal having the same frequency as said second clock signal switch by said write/read controller when outputting a hybrid analog signal to a sound output device, and D/A converting said read hybrid digital sound signal to a hybrid analog signal;

a select switch for switching said hybrid analog signal to a sound output device or a magnetic recording-/reproduction device;

a sound output device for converting said D/A converted analog sound signal or said hybrid analog signal into a sound and outputting said sound; and a magnetic recording/reproduction device for FM modulating said D/A converted hybrid analog signal and recording said modulated hybrid analog sound signal on said rotary magnetic recording medium.

4. An audio recording device as claimed in claim 3, wherein said magnetic recording medium is a floppy disk.

* * * * *